No. 769,416. Patented September 6, 1904.

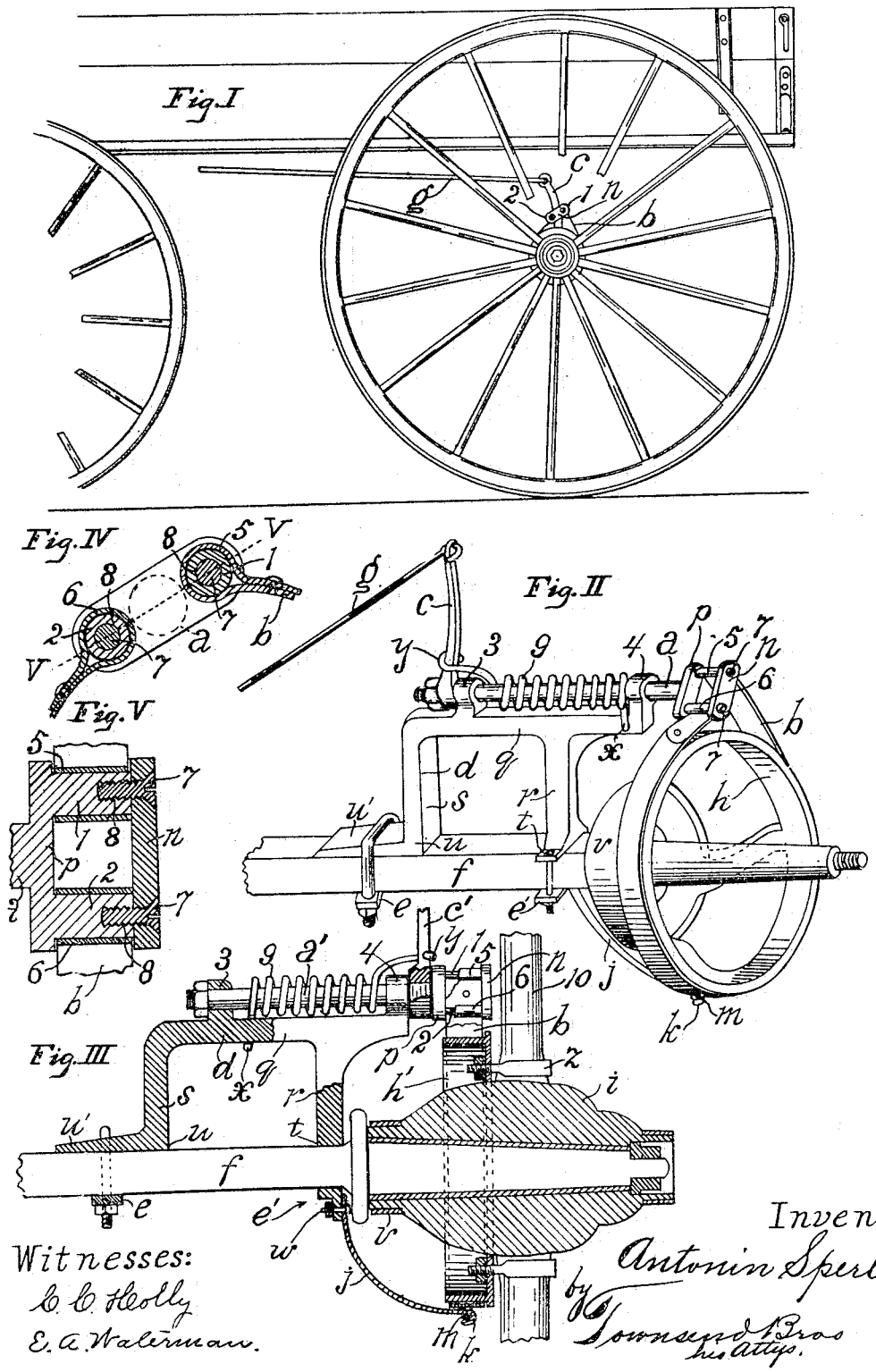

UNITED STATES PATENT OFFICE.

ANTONIN SPERL, OF LOS ANGELES, CALIFORNIA.

BAND-BRAKE FOR VEHICLES.

SPECIFICATION forming part of Letters Patent No. 769,416, dated September 6, 1904.

Application filed June 19, 1902. Serial No. 112,392. (No model.)

*To all whom it may concern:*

Be it known that I, ANTONIN SPERL, a citizen of the United States, residing at Los Angeles, in the county of Los Angeles and State of California, have invented a new and useful Improvement in Band-Brake Fixtures for Carriages, Wagons, Automobiles, and the Like, of which the following is a specification.

My invention relates to a very compact, simple, light, and positive brake by which the wheels of wagons, carriages, and the like can be held against rotation to any extent desired by the driver of the vehicle.

An object of my invention is to provide a superior simple form of a band-brake which can be readily attached to the axle and hub of an ordinary vehicle and will positively hold the wheel against rotation in either direction, so that when the brake is set for the purpose of stopping the vehicle when going in one direction it will equally serve the purpose of preventing the vehicle from moving back, although the vehicle may have been stopped by the brake while going up hill.

Another object is to provide for instant release of the brake by simple and compact means.

The accompanying drawings illustrate my invention.

Figure I is a side elevation of a wagon furnished with my invention. Fig. II is a perspective detail of the invention attached to a wagon-axle, a fragment of which is shown. A portion of the friction-ring of the wheel-hub is also shown in place, although the vehicle-wheel is omitted from this view. Fig. III is a fragmental longitudinal sectional view showing the invention applied to a wagon in another form. Fig. IV is a fragmental sectional detail showing the preferred construction of the attachment between the band and crank-shaft. Fig. V is a fragmental section on line V V, Fig. IV.

$a$ designates a crank-shaft furnished at one end with two pins 1 2.

$b$ designates the brake-band to encircle the wheel-hub and fastened at its ends to said pins, respectively.

$c$ designates the crank-arm on the crank-shaft $a$.

$d$ designates a bracket for attachment to the axle and furnished with a bearing for the shaft. The loops 3 4, projecting from said bracket, form the said bearing for the shaft $a$.

$e\ e'$ designate clips by which the bracket is fastened to the axle $f$.

$g$ designates the rod for operating the crank $c$ to rotate the crank-shaft $a$.

$h$ designates the friction-ring for the hub $i$ of the vehicle-wheel.

$j$ designates a resilient brace fastened to the clip $e'$ and extending beneath the brake-band $b$ and connected therewith by means of the hook $k$, hooked into a loop $m$, fastened to the brake-band $b$.

5 6 designate loops on the ends of the band $b$, respectively looped over the pins 1 2. $n$ designates a cross-bar on the ends of said pins and fastened in place by screws 7, screwed into screw-threaded sockets 8 in the ends of the pins, respectively.

The resilient brace $j$ is attached at substantially midway between the ends of the brake-band, where there is no longitudinal movement of said brake-band when the brake is operated. This arrangement avoids making any undesirable sliding connection between said brake-band and brace.

In practical operation when the crank-shaft $a$ is rotated the circumference of the circular figure formed by the brake-band $b$ is contracted positively by the change of position of the pins 1 2, thus drawing the brake-band tight upon the hub-ring $h$. By preference the pins 1 2 are symmetrically disposed equidistant from and on opposite sides of the axis of the shaft $a$. For convenience of construction the crank-shaft $a$ is furnished with a cross-head $p$, from the opposite ends of which the band-holding pins 1 2 project.

In the form shown in Fig. III the bracket is furnished with a bar $q$, having at one side the loops 3 4 to form bearings for the rock-shaft and having on the opposite sides standards $r\ s$, provided, respectively, with feet $t\ u$ to fit upon the vehicle-axle. One of said feet, $u$, is provided with a toe $u'$ to project parallel with said bar $q$. The clip $e$ fits over said toe to clamp the same upon the axle, and the clip $e'$ clamps the foot $t$ to the axle. The friction-ring $h$ is furnished with a hub-ring $v$ for attachment to the hub of the vehicle-wheel. The brace $j$ is fastened to the clip $e'$ by means of a bolt $w$ and exerts a yielding force to hold the brake-band normally away from the friction-ring, as clearly shown in Fig. III, so that it serves the double purpose of withdrawing the brake-band from the friction-ring and also of holding the brake-band in true position. It is connected with the axle through the clip and with the brake-band opposite the rock-shaft $a$, so as to constantly tend to draw the brake-band away from the friction-ring.

9 designates a spring to turn the shaft $a$ to its normal position. Preferably the spring is in the form of a coil-spring around said shaft, one end, $x$, of which spring engages the bracket $d$, and the other end, $y$, of said spring engages the crank-arm $c$ to return it to release the brake-band $b$.

The parts may be differently constructed and arranged, as indicated by the different forms shown in Figs. II and III. In Fig. III the crank-arm $c'$ is applied to the shaft $a'$ close to the cross-head $p$, and the friction-ring $h'$ is fastened by clips $z$ to the spokes 10 of the wheel; but it is to be understood that I do not limit myself to any mode of fastening the friction-ring to the wheel.

What I claim, and desire to secure by Letters Patent of the United States, is—

1. A brake-fitting comprising a bracket furnished with a bar having at one side loops to form bearings for a rock-shaft and having on the opposite side standards provided with feet to fit upon a vehicle-axle, one of said feet being provided with a toe to project parallel with said bar; a clip to fit over said toe to clamp the same upon the axle; a clip for clamping the other foot to the axle; a friction-ring furnished with a hub-ring for attachment to the hub of the vehicle-wheel; a rock-shaft journaled in the loops of the bracket and furnished at one end with a crank-arm and at the other end with a head having two projecting pins; a brake-band pivoted to said pins respectively and encircling the friction-ring; and means for fastening the ends of the brake-band on said pins.

2. A brake-fitting comprising a bracket furnished with a bar having at one side loops to form bearings for a rock-shaft and having on the opposite side standards provided with feet to fit upon the vehicle-axle, one of said feet being provided with a toe to clamp the same upon the axle; a clip for clamping the other foot to the axle; a friction-ring furnished with a hub-ring for attachment to the hub of the vehicle-wheel; a rock-shaft journaled in the loops of the bracket and furnished at one end with a crank-arm and at the other end with a head having two projecting pins; a brake-band pivoted to said pins respectively and encircling the friction-ring; means for fastening the ends of the brake-band on said pins; and a brace connected at one end with one of the clips and connected at the other end with a brake-band near its mid-length.

3. The combination with a vehicle-axle and a vehicle-wheel thereon; of a bracket; clips fastening the bracket to the axle; a rock-shaft journaled on the bracket and furnished with a lever for its partial rotation and with a coiled spring around said shaft and connected thereto to operate it in opposition to said lever, and also furnished with a head and two pins thereon; a friction-ring furnished with a collar fitted upon and fastened to the hub of the wheel; a brake-band connected at its ends with said pins and encircling the friction-ring and furnished substantially midway between its ends with a loop; and a resilient brace connected with the axle at one end and with said loop at the other end, said brace arranged to yieldingly hold said brake-band away from the friction-ring.

4. A brake-band fitting for vehicles, comprising a shaft, operating means for turning said shaft, spring means carried by and connected to said shaft to turn the same in opposition to said operating means, means carried by said shaft and adapted to contract said brake-band when the shaft is turned, a friction-ring encircled by said brake-band, and a resilient brace attached to the brake-band at substantially midway of the ends thereof and arranged to yieldingly hold said brake-band away from said friction-ring.

In testimony whereof I have signed my name to this specification, in the presence of two subscribing witnesses, at Los Angeles, California, this 14th day of June, 1902.

ANTONIN SPERL.

Witnesses:
JAMES R. TOWNSEND,
F. M. TOWNSEND.